June 2, 1964     F. H. MARTIN, JR     3,135,054
METHOD AND MEANS OF MEASURING AND LOCATING VARIATIONS
IN SIZE IN A LENGTH OF MATERIAL
DURING PROCESSING OR HANDLING
Filed Dec. 6, 1960     5 Sheets-Sheet 3

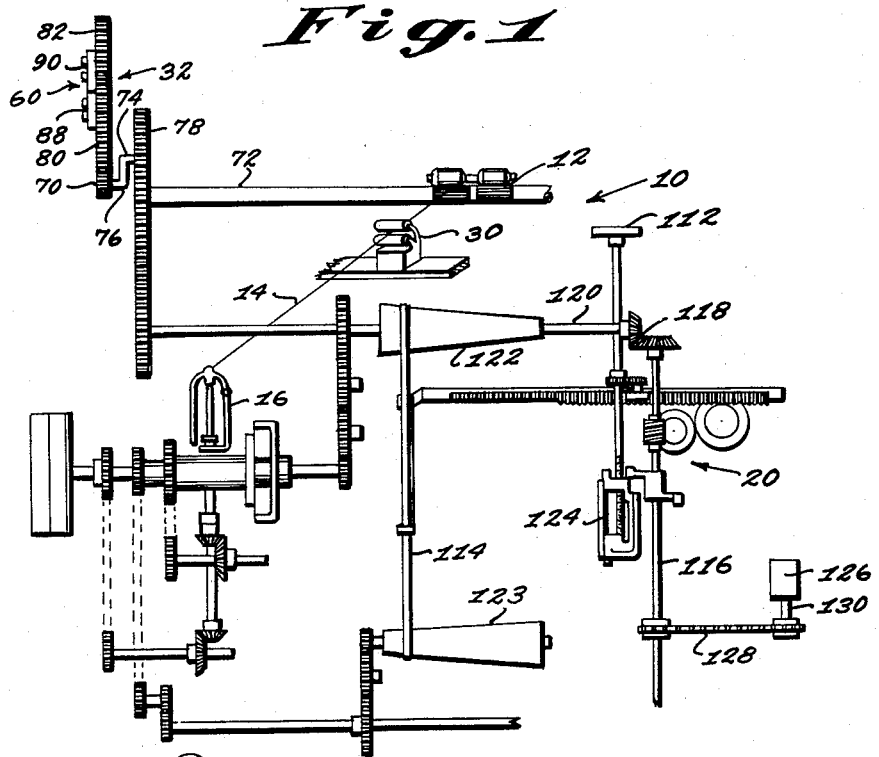

INVENTOR.
FURMAN H. MARTIN, JR.
BY Warley L. Parrott
ATTORNEY

June 2, 1964  F. H. MARTIN, JR  3,135,054
METHOD AND MEANS OF MEASURING AND LOCATING VARIATIONS
IN SIZE IN A LENGTH OF MATERIAL
DURING PROCESSING OR HANDLING
Filed Dec. 6, 1960  5 Sheets-Sheet 4

INVENTOR.
FURMAN H. MARTIN, JR.
BY
Warley L. Parrott
ATTORNEY

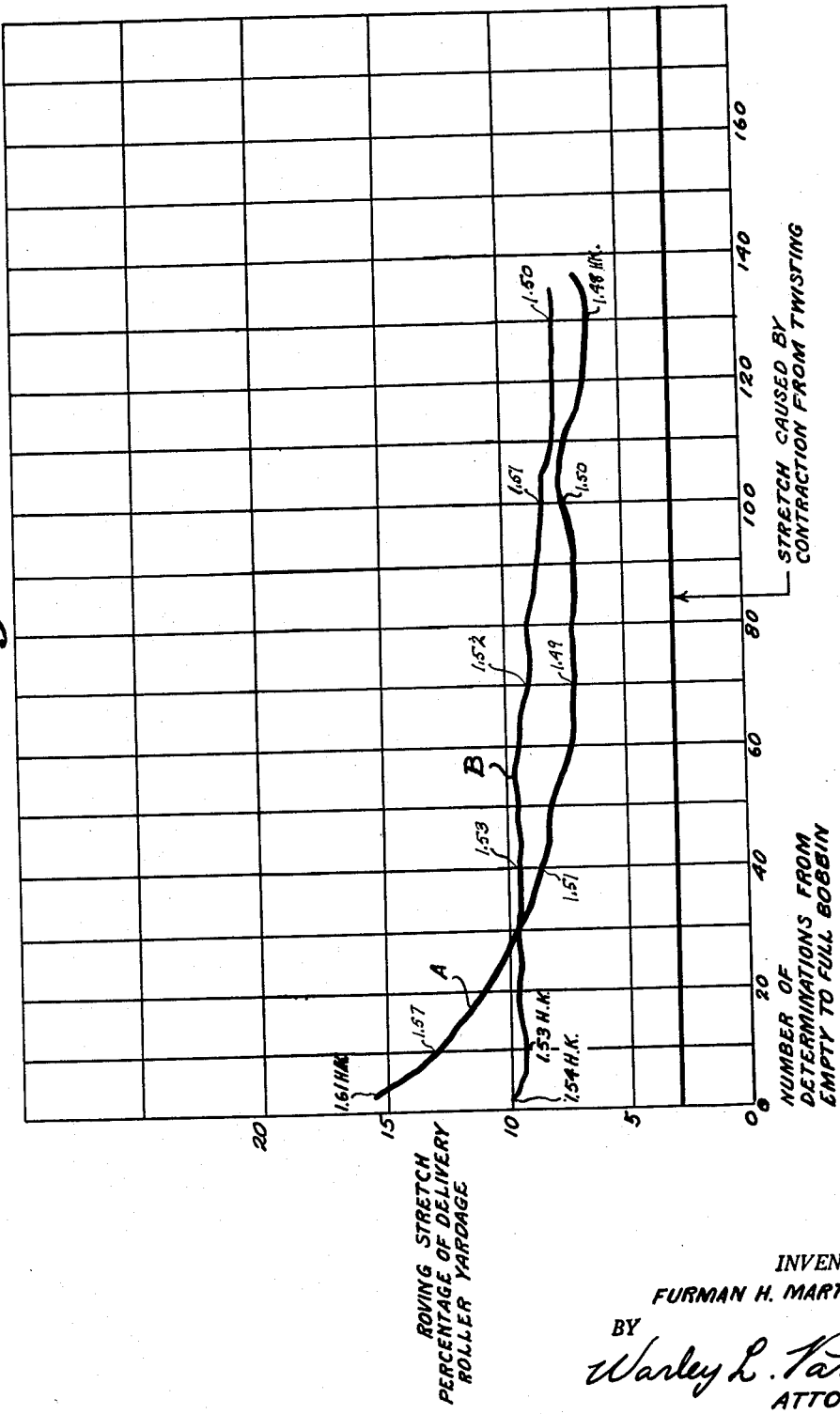

United States Patent Office
3,135,054
Patented June 2, 1964

3,135,054
METHOD AND MEANS OF MEASURING AND LOCATING VARIATIONS IN SIZE IN A LENGTH OF MATERIAL DURING PROCESSING OR HANDLING
Furman H. Martin, Jr., Fort Mill, S.C., assignor to The Springs Cotton Mills, a corporation of South Carolina
Filed Dec. 6, 1960, Ser. No. 74,018
15 Claims. (Cl. 33—129)

This invention relates to a method and means for measuring and locating variations in size occurring in a length of material during processing, and more particularly to a method and means whereby increments of determinable length are indicated along a strand of material before or at the beginning of processing of said material and the same increments are measured after processing. The lengths of the increments before and after processing are then compared to determine elongation in each increment. This elongation is proportional to the change in weight per unit length in the increment and thus the location and amount of variations in size are determined by the present invention.

Further, as variations in weight per unit length are proportional to the amount of elongation or stretch, relative changes in weight per unit length can be determined directly and positively by measuring the stretch occurring during processing. Therefore, the present invention is directed as well to a method and means for measuring stretch occurring in a length of material during processing.

In many fields of manufacture, processing or handling of materials it is important to determine the weight per unit length and other characteristics of the material and the location and amount of variations therein. This is important not only because it provides information as to uniformity and quality, but also because it may be indicative of conditions that are occurring at a particular place or time in the manufacturing, processing or handling operation, which conditions can be adjusted once the location and amount of variation are determined. Thus the present invention is broadly applicable to many different fields and should not be limited to the specific application described herein for illustrative purposes only.

One particular application of the present invention is in the processing of textile roving. The strength and other characteristics of a roving strand or other length of textile material are dependent upon the thickness or weight per unit length of the strand, variations in weight per unit length resulting in non-uniform characteristics. Thus the determination of amount and location of variations is important. Further, variations in the roving are indicative of running characteristics of the roving package at roving, spinning, and subsequent processing, and indicative of package density or capacity. Thus determination of the location and amount of variations will indicate where adjustments should be made in the process to control these characteristics.

In the normal operation of a roving or "flyer" frame the roving or strand of drafted textile fibers is delivered at the front of the frame by means of a pair of superimposed drafting or delivery rollers. From this point the drafted web or strand of fibers is drawn into a revolving "flyer" which twists the web into a substantially cylindrical strand of "roving" that is drawn through the hollow leg of the flyer. The twisted strand is then led around the presser arm located at the lower end of the flyer and onto the bobbin. The twisting of the stand produced by the revolving flyer contracts the strand lengthwise, and this contraction in conjunction with the difference between the rate of feed of the rollers and the take-up speed of the bobbin stretches the strand. This stretch and accompanying tension determine to a considerable degree, (1) the density or capacity of the package, as the greater the stretch and tension the tighter the winding; (2) the shape of the strand, as the stretch reduces the weight per unit length; and (3) the running characteristics of the finished roving package, as variations in stretch and tension cause variations in the roving and the greater the degree of non-uniformity of the roving the greater non-uniformity occurs during spinning and other processing and the greater the difficulties of spinning and otherwise processing. Unusual variations in stretch and tension during winding may produce a roving package so irregular in density as to prevent its satisfactory operation on the roving frame, or the completed roving package may tangle and become unusable during subsequent handling, or the package may be damaged so as to be unusable in subsequent operations.

As the roving stretch and tension during package building are important in their effect on package density or capacity, shape, and running characteristics, both at the roving frame and during subsequent operations, it is obvious that it is desirable to determine the amount and location of variations of stretch or tension so that adjustments can be made at the proper place to control these factors.

Present methods of determining variations in roving measure the total irregularities that are present in the roving after unwinding including irregularities that were in the strand before the particular processing being tested. Therefore they do not isolate only those irregularities that are introduced by the particular processing.

Attempts have also been made to locate and determine variations by measuring the tension in the roving strand at a selected location during processing, relying on the proposition that generally the amount of tension is proportional to the resulting characteristics of the roving strand. However, measuring tension does not provide a positive and reliable indication of relative characteristics as other factors also affect changes in weight per unit length. Further, these attempts have been inaccurate as they measure tension at only one location and tension actually varies at different places in the processing. Also, to measure tension it is necessary to contact or engage the strand in some manner, thereby increasing the tension so that the tension when measured is not the same as the normal operating tension. In addition, tension is not always proportional to stretch even at a specific location in the processing. For example, when the strand is stretched beyond the yield point stretch will continue readily even though the tension may be diminished and approaches zero.

The basic conception of the present invention is the realization that positive, direct and reliable results can be obtained by measuring elongation or stretch rather than measuring irregularities in the finished strand or by measuring tension, as changes in the roving strand are truly proportional to the amount of elongation or stretch and are not consistently proportional to ultimate irregularities or tension at a specific location. By measuring the stretch that occurs from passing the strand through the process the total effect of the different tensions in the various locations throughout the entire process are taken into account. Obviously, to obtain representative measurements the roving frame operation should not be interrupted while forming a package and the strand should be disturbed as little as possible, and by the present invention the winding is not interrupted and the strand is only contacted at intervals with a slight marking contact.

The measurement of stretch is obtained in the present invention by marking the strand as it leaves the front or delivery rollers at intervals of known or determinable length and again measuring the length of the increments between intervals after winding and then comparing with the original length. The difference in length in each increment represents the stretch occurring in that increment as a result of the winding operation and is indicative of the variation in size. Knowing size or lineal weight of the strand before winding and the change in length, the resulting weight per unit length can be computed. This indicates not only the roving size in the increment, but also other characteristics such as the capacity of the package and the running characteristics. With this knowledge the apparatus can be adjusted to vary the operating conditions and control these factors within desirable limits.

In the preferred embodiment of the present invention the marking of the roving strand is accomplished as it leaves the delivery rollers by a pair of marking rollers that are normally not in contact with the strand. One of these marking rollers is actuated by a solenoid to force the strand against the other roller, and thereby mark the strand. The solenoid is connected in an electrical circuit that has a normally open switch that is closed intermittently at a predetermined number of revolutions of one of the delivery rollers. This switch closing is accomplished by means of a pair of meshing gears driven from the delivery roller. One or these gears is pivotally mounted for movement away from the other gear. One gear has one more tooth than the other gear and each gear has a hunting tooth engageable with the hunting tooth of the other gear after a number of revolutions corresponding to the number of teeth on the other gear. When the hunting teeth engage they cause the gears to separate, pivoting the pivotally mounted gear. A switch closing member is attached to the mounting of the pivotal gear and upon movement thereof it closes the switch to energize the marking solenoid. The number of delivery roller revolutions and the circumference of the delivery roller determine the length of material advancing between markings. The number of gear teeth and the hunting teeth arrangement can be designed to energize the solenoid at intervals corresponding approximately to reversals of the builder motion of the roving frame so that the marked increments correspond somewhat to the layers of roving being wound on the bobbin.

After the strand is wound on the bobbin, the bobbin is doffed and placed in supported position on an unwinding drum, which rotates and in so doing rotates the bobbin so that the roving is unwound without tension. The lengths between markings on the unwound strand are then measured and compared with the lengths before winding, thereby providing a measurement of the stretch occurring in each increment being measured. This stretch is directly proportional to the increase in length of the increment and therefore proportional to the decrease in weight per unit length.

In another embodiment of the present invention, having a similar marking mechanism, the solenoid is actuated in response to builder motion cycles so as to mark the roving to indicate layers on the bobbin. In this embodiment the solenoid is connected in an electrical circuit having a four-way rotating switch that is rotated when the builder motion rotates to build another layer and in so doing closes the solenoid circuit to effect marking of the strand. The switch is in alternate dwell positions between rotations of the builder motion shaft and in these alternate dwell positions it is alternately connecting one of two electrical counters into the electrical circuit. These counters are in turn connected to a rotating contact member that is driven by the delivery roller and rotates over and in contact with stationary contact members so that the circuit is completed every time the moving contact member contacts the stationary contact member, thereby indexing the electrical counter to count the delivery roller revolutions between markings. The use of two counters is helpful in that they are in alternate inoperative positions where they can be read while the counting of the continuous winding proceeds through operation of the alternate counter. The package is unwound in the same manner as in the preferred embodiment, and similarly a comparison of the lengths of the increments before and after winding is made to determine stretch and relative variation in weight per unit length. In this embodiment the marked increments correspond substantially to the layers of the package, thus stretch and weight per unit length of each layer are determined.

The above embodiments of the present invention are described in detail below, and the features and advantages of the present invention will be apparent from the following description and drawings in which:

FIG. 1 is a diagrammatic front elevational view of a portion of a roving frame including elements of the builder motion assembly, the marking rollers, the counting means of the preferred embodiment of the present invention, and the counting means of an alternate embodiment;

FIG. 2 is an enlarged diagrammatic view partially in section, of a portion of the roving frame and marking elements illustrated in FIG. 1;

FIG. 9 is a graph on which are plotted measurements made using the method and means of the present invention.

Figure 3:
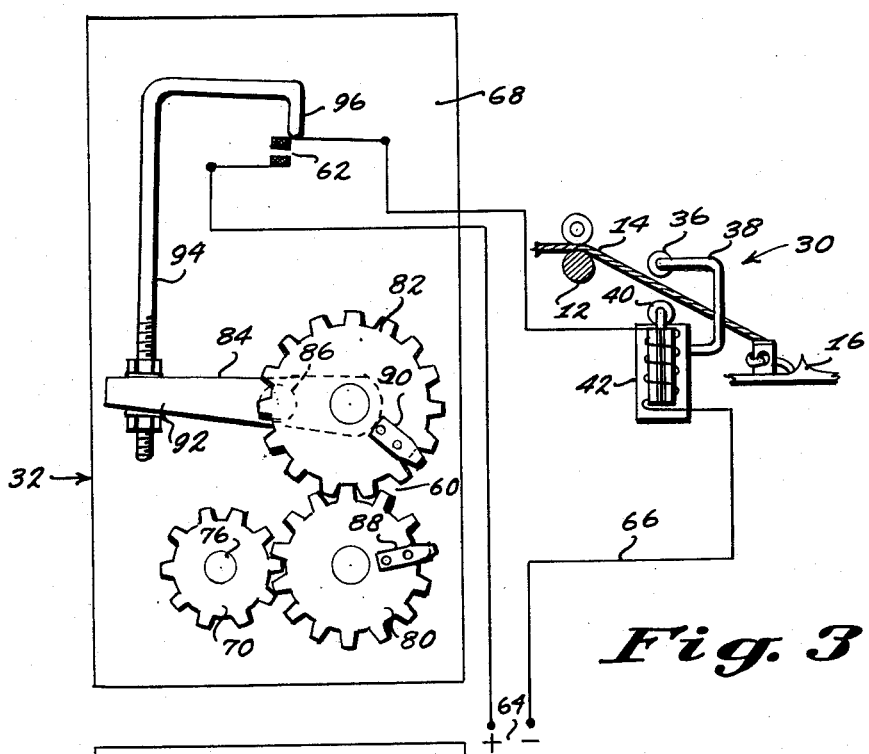
FIG. 3 is a diagrammatic view of the marking apparatus and electrical circuit of the preferred embodiment of the present invention, showing the elements in a non-marking position.

The preferred embodiment of the present invention is designed for adaptation to a conventional roving frame 10, such as that diagrammatically illustrated in FIG. 1, wherein a pair of drafting or delivery rollers 12 are mounted at the top of the frame 10 and deliver the roving 14 from the drafting elements to the revolving flyer mechanism 16 through which the roving 14 is drawn as it is wound on the rotating bobbin 18. The bobbin 18 is controlled by a builder motion assembly 20 that reciprocates the bobbin vertically to form the roving in layers as it is wound on the bobbin.

The roving 14 enters the flyer 16 through a central opening 22 in the top and then passes out a side opening 24 in the flyer, whereby the rotation of the flyer imparts a twist to the roving. The flyer 16 has a hollow leg 26 extending parallel to and spaced from the bobbin 18 and through which the roving 14 is drawn. A pressure arm 28 extends from the lower end of the hollow leg 26 to direct the roving 14, which is wrapped around the arm 28, onto the bobbin 18. The twisting of the roving 14 causes a contraction that reduces the normal length of the roving, and this contraction in conjunction with the difference between the speed of the bobbin 18 and the rate of the delivery roller 12 produces a relative stretching of the roving 14.

Measurement of the stretch and location of the stretch occurring in a roving being processed on a conventional roving frame, such as that described above, is accomplished by the preferred embodiment of the present invention by marking means 30 provided for marking the strand 14 at intervals as the strand leaves the delivery roller 12 and counting means 32 for counting the number of revolutions of the delivery roller 12, with the marking means 30 and counting means 32 interrelated so that the number of roller revolutions during each marking interval is determined. The length of the increments of the roving strand between markings is readily computed from the number of revolutions and the circumference of the delivery roller. These increment lengths are then measured after winding by the use of unwinding means 34, which unwind the marked strand from the formed package without tension so that the length of the marked increments after winding can be determined and compared with the length before winding thus indicating the amount of stretch which is indicative of the decrease in weight per unit length and also indicative of package density and running characteristics.

The marking means 30, as seen in FIGS. 1–4, comprises a fixed roller 36 that is mounted on a bracket 38 above the strand adjacent the delivery roller 12, and a movable roller 40 mounted below the roving and aligned with the fixed roller 36. The movable roller 40 is operated by a solenoid 42 which moves the roller 40 from a normal position out of contact with the strand into a position where it is engaging the strand and forcing it against the fixed roller 36. The fixed roller 36 has ink thereon, which marks the strand when the strand touches the roller.

As seen in FIG. 2, the solenoid 42 from which the movable arm 40 extends and to which the bracket 38 of the fixed arm 36 is attached, is adjustably mounted on an arm 44 supported by the roving frame 10. The arm has slots 46 and 48 at each end to receive locking screws, with the screw 50 in slot 46 in the outer end of the arm attaching the solenoid 42 to the arm at a desired position along the slot 46, and the locking screw 52 in the slot 48 in the inner end of the arm 44 attaching the arm to an upstanding magnet 54 that holds the marking means 30 in a selected position on the frame 10. Another locking screw 56 in the slot 48 at the inner end of the arm 44 attaches a slotted leg 58 to the arm 44 for support of the arm above the frame in an adjustable position. Thus the marking rollers 36 and 40 can be positioned as desired to suit changes in operating conditions.

Figure 4:
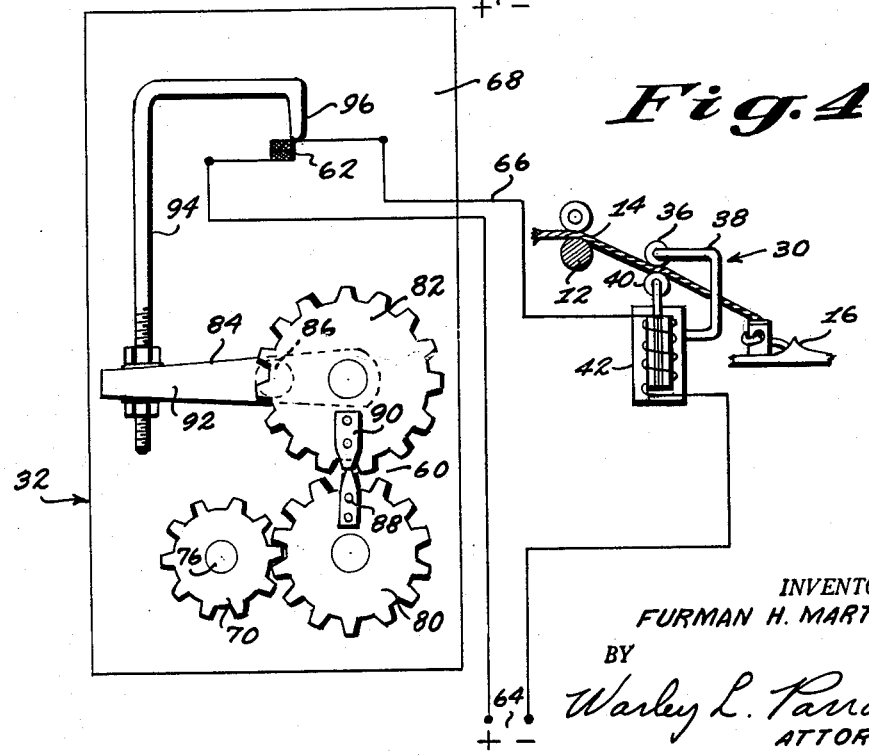
FIG. 4 is a view similar to FIG. 3 showing the elements in marking position.

The counting means 32 of the preferred embodiment is illustrated in FIGS. 3 and 4 and is based on the concept of measuring a predetermined number of revolutions of one of the delivery rollers 12 by means of a "hunting tooth" gear arrangement 60 and using this "hunting tooth" gear arrangement 60 to activate an electrical switch 62 connected to a low voltage supply 64 in the electrical circuit 66 in which the marking solenoid 42 is connected. This low voltage signal activates the solenoid 42 to mark the strand of roving 14 near the delivery roller 12 at predetermined lengths which may be adjusted to be more or less than one complete roving layer as desired. The "hunting tooth" gear arrangement 60 is mounted on a support 68 that is removably attached to the frame 10, and the arrangement 60 comprises a driver gear 70 positively driven from the delivery roller shaft 72 by any suitable means such as a crank arm 74 extending from the shaft 76 of the driver gear 70 and connected to the roller shaft gear 78. This driver gear 70 drives the lower or drive hunting gear 80, which in turn drives an upper or driven hunting gear 82 that is mounted on a pivotable arm 84 for movement toward and away from the lower gear 80. This arm 84 is pivotably mounted on a stud 86 extending from the support 68. The total teeth in the individual hunting gears differs by one tooth. This means that a specific tooth in one gear will mesh with a specific space between teeth in the opposite gear every time the smaller gear makes the same number of revolutions as there are teeth in the larger gear, during which period the larger gear makes the same number of revolutions as there are teeth in the smaller gear. Since this coincidence of the meshing of the teeth of the gears occurs at regular, predetermined intervals, the effect can be used to activate the marking means 30 at measured intervals. This is accomplished by two adjustable lugs 88 and 90 mounted on the hunting gears 80 and 82. The lug 88 on the lower or drive gear 80 is mounted to coincide with a tooth while the lug 90 on the upper gear 82 is mounted so as to coincide with a space between two teeth. During the number of revolutions of one gear equal to the number of teeth in the opposite gear minus one the lugs do not coincide and the elements are in the relative position illustrated in FIG. 3, wherein the marking means are inoperative. On the one revolution when the lugs coincide they force the gears to separate, raising the driven gear 82 as shown in FIG. 4. Since this gear 82 is mounted on the pivotable arm 84 this action causes the opposite end 92 of the arm to move downward carrying with it a vertically extending adjustable rod 94 which has a finger 96 that engages the electrical switch 62 when the arm 84 is pivoted, thereby closing the switch 62 and energizing the circuit 66 to cause the solenoid 42 to lift the movable roller 40 and force the strand of roving 14 up against the fixed inking or marking roller 36. Since the two lugs 88 and 90 are only briefly in contact with each other as they pass, the switch 62 is closed for only a fraction of a second. However, this is sufficient to leave a visible mark on the roving each time this cycle occurs and since there is no reset time required the hunting gears 80 and 82 immediately start a new measuring cycle of exactly the same length as the first cycle, at the end of which the roving is again marked. This continues so that predetermined lengths of roving are marked at the point of leaving the delivery roller 12 until the roving package is doffed or completed.

Figure 5:
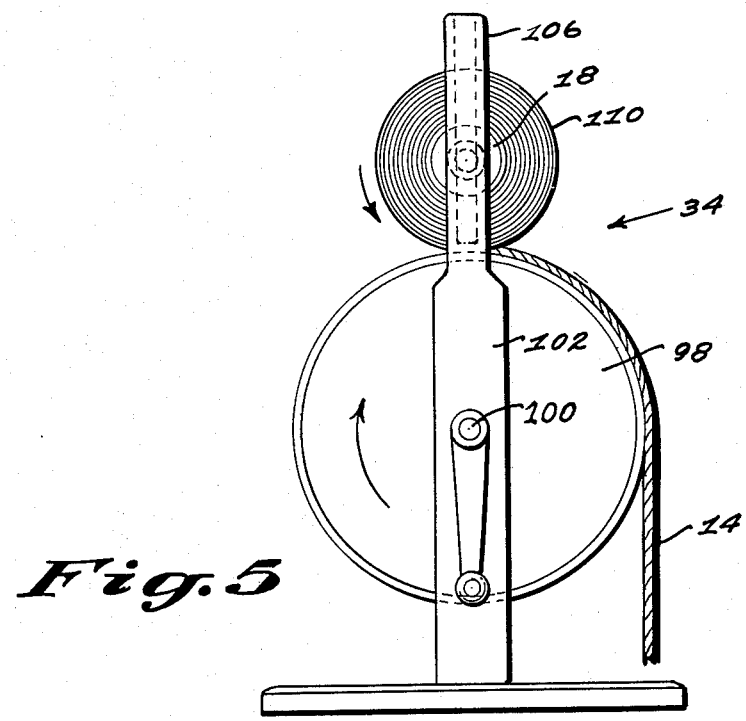
FIG. 5 is a side elevational view of the unwinding apparatus of the preferred embodiment of the present invention.
Figure 6:
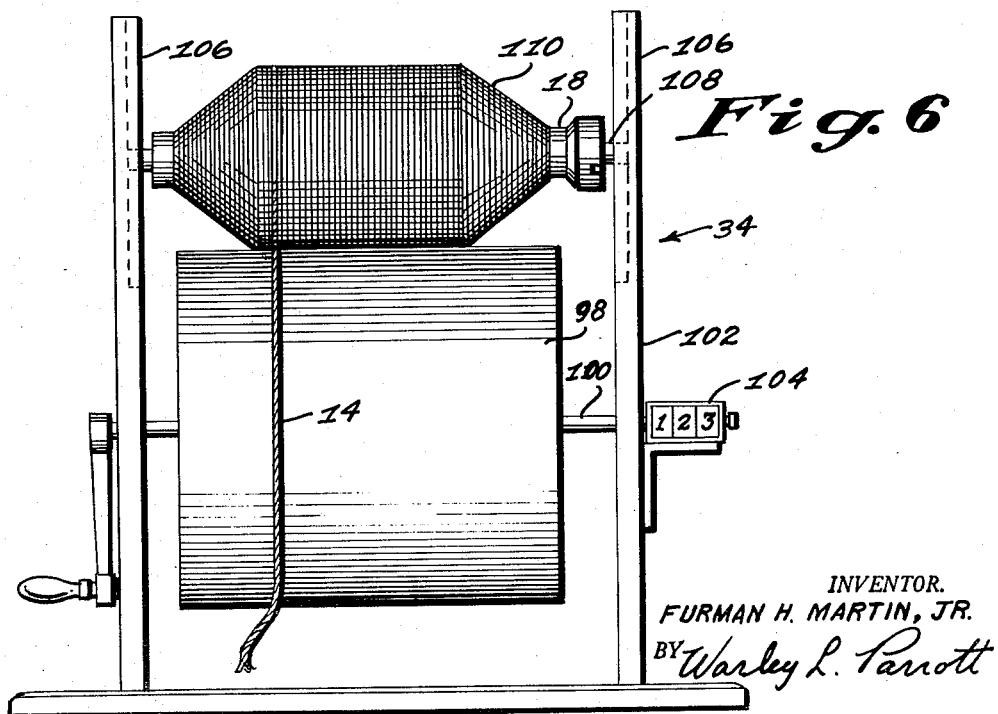
FIG. 6 is a front elevation view of the unwinding apparatus of FIG. 5.

The unwinding means 34 illustrated in FIGS. 5 and 6, unwinds the marked strand from the completed package, and comprises a hand driven drum 98 of known circumference mounted on a rotatable horizontal shaft 100 on a supporting framework 102. The shaft 100 is connected to a mechanical counter 104 in such a manner as to indicate revolutions and fractions of a revolution of the shaft and drum. Channeled vertical members 106 extend upwardly from the framework 102 for support of a rotatable and vertically movable horizontal shaft 108 in the channeled members 106 above the drum. This shaft 108 positions the bobbin 18 with the roving package 110 thereon in contact with the drum 98 for rotation in response to rotation of the drum 98 during the unwinding and measuring operation. In this mechanical measuring assembly 34 the weight of the roving package 110 supplies the necessary pressure to affect rotation of the package with the drum 98 with minimum slippage. Since the package 110 is in contact with the drum 98 throughout the length of the package a maximum driving surface is utilized to reduce slippage and subsequent error in measuring the length of roving being unwound from the package. This is advantageous as compared with previous methods where the roving package is supported independently and is rotated by pulling the single strand of roving, thereby causing additional stretch of the roving and providing a major source of error.

As the roving is unwound from the package the lengths of the marked increments are measured by counting the revolutions of the drum, which may have a calibrated surface to aid in obtaining exact measurements. This measurement when compared with the original known length between marks determines the amount of stretch imparted during the roving frame operation. To facilitate the translation of the roving length values into percentage stretch values the stretch percentages are usually precalculated for all likely length values and formed into a table for ready reference. Results of each stretch determination can then be plotted on a printed form for consideration in determining adjustments and for comparison with charts plotted after adjustments have been made in the apparatus. By varying the cone belt position, tension gear and other elements of the roving frame and builder motion assembly, the tension and stretch at selected locations can be controlled to produce substantially uniform stretch, hank, and other characteristics.

A graph for plotting stretch values for a typical operation using the method and means of the present invention is illustrated in FIG. 9. Curve A shows results of an initial test for a particular roving frame. This curve indicates that a stretch of as much as 16% occurs during winding of the first several layers of the roving strand onto the bobbin. This stretch produces a thin roving at this point with a corresponding low weight per unit length of 1.61 hank and a related increased package density. The stretch of curve A decreases from the initial 16% to about 6 or 7%, a change of 9 to 10%, which is undesirable and indicates that the frame and builder motion should be adjusted to reduce the extreme initial stretch.

Curve B indicates values obtained on the identical roving frame after adjustments made from a study of curve A. After these adjustments the stretch varies only about 2 or 3% from 10% to about 7½%, with a corresponding variation in hank of only 0.04, from 1.54 hank to 1.50 hank.

The above stretch values include an amount of 3% to account for the contraction produced by twisting as the strand runs through the flyer. In other words, if the length of a particular increment did not increase as it passed through the roving frame operation there would still be a relative stretch of 3%, due to this twist contraction.

In the above described preferred embodiment the apparatus marks the roving at equal initial lengths, which may be adjusted approximately equal to the length of roving in a representative layer on the package. However, this is only approximate as the layers taper and do not each have the same length of roving therein. If it is desired to mark increments in more exact relation to layers on the package a modified embodiment of the marking and counting means can be substituted for the corresponding elements of the preferred embodiment. In this modified embodiment the counting and marking means are controlled from the conventional builder motion assembly.

The conventional builder motion assembly 20 functions to reverse the up and down motion of the carriage 112 of the roving frame 10 as each layer of roving is applied, to move the cone belt 114 for tension change, and to change the taper and shape of the roving package. This device is familiar to operators of this type equipment and will not be described in detail or illustrated except for the vertical shaft 116 which carries the gap-gear, worm-gear and builder dog. As seen in FIG. 1, this vertical shaft 116 is located in the center of the builder motion assembly 20 and is rotated positively one-half revolution by a gear drive 118 at the end of the top cone shaft 120 at the completion of each layer of roving on the roving bobbin or package. This motion sets up a series of mechanical changes in the roving frame 10 which reverses the carriage 112 to start a new layer, changes the bobbin speed by adjusting the cone belt 114 on the cones 122 and 123, and adjusts the builder jaws 124 to build a progressively shorter layer at the end of each carriage traverse. Since the rotation of this vertical shaft 116 corresponds exactly with the start and completion of each layer and therefore each pair of layers, the movement of this shaft can be used to activate a marking solenoid switch to mark increments corresponding to layers, and to operate alternate electric counters to count the delivery roller revolutions for each layer or pair of layers.

In this embodiment the hunting tooth gear arrangement 60 of the preferred embodiment seen at the upper left of FIG. 1 is not used. Rather the counting and control mechanism 126 seen at the lower right in FIG. 1 is used. This mechanism 126 is not a part of the preferred embodiment.

The counting and control mechanism 126 may be connected to the vertical shaft 116 of the builder motion assembly 20 in any suitable manner, such as by the sprocket and chain arrangement 128 of FIG. 1, wherein a control shaft 130 is driven at the same rate as the builder motion vertical shaft 116. The control shaft 130 carries a contact arm 132 that carries a movable contact member 134, which constitutes a four-way electrical selector switch that is connected by a lead wire 136 to a low voltage electrical supply 138, with the contact member 134 arranged to rotate and contact alternately in a circumferential path two pairs of electrodes 140, 141 and 142, 143. As the shaft 130 of the selector switch 134 is driven by the builder motion vertical shaft 116, it rotates in half revolution increments simultaneously with the vertical shaft.

Figure 7:
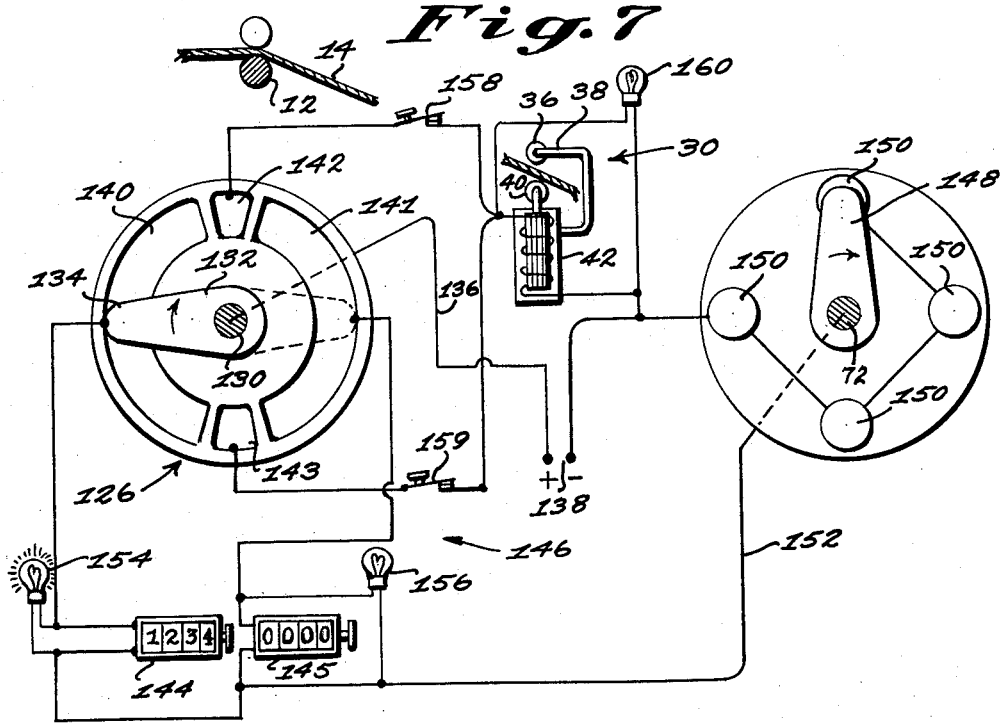
FIG. 7 is a diagrammatic view of the marking apparatus, counting means, and electrical circuit of another embodiment of the present invention, showing the elements in non-marking position.
Figure 8:
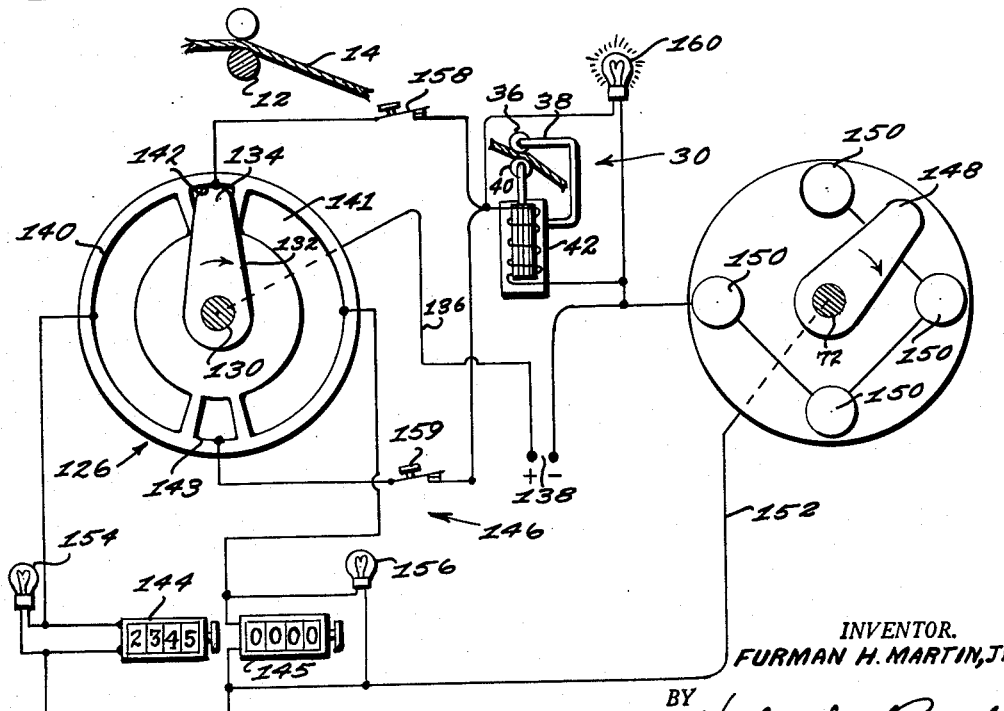
FIG. 8 is a view similar to FIG. 7 showing the elements in marking position.

In operation the selector switch 134 is positioned as shown in FIG. 7 throughout the building of every other layer of roving, and in the position shown in dotted lines in FIG. 7 throughout the building of alternate layers of roving. In these dwell positions the switch connects alternate electrical counters 144 and 145 in the circuit 146 for counting delivery roller revolutions during building of each layer on the package. The use of alternate counters is advantageous as it results in each counter being idle while winding of alternate layers, giving the operator an opportunity to read and record the counted revolutions and reset the counter before the counter is again activated.

The counters 144 and 145 are connected to a rotary multiple electrical switch 148 driven at the same rate of speed as, and usually by, the delivery roller drive shaft 72. This switch 148 consists of one, two, or more equally spaced contactors 150 arranged around the circumferential path of the rotating contactor arm 148, so that for each revolution of the shaft 72 one electric pulse is transmitted to each contactor 150 in sequence. The purpose of a multiple contact switch is to increase the number of pulses per revolution of the delivery roller 12 and thereby indicate fractions of a revolution of the roller. The electrical pulse is transmitted by means of a suitable lead wire 152 from the contactors 150 to the electrical counters 144 and 145.

In the dwell positions of FIG. 7, the electrical pulses from the rotary switch 148 are transmitted through the lead wire 152 to one of the electric counters 144 or 145 where each pulse is counted as one unit. In addition, the pulse is shown as one flash on the indicator lamp 154. The circuit through the counter 144 is completed through the stationary contactor plate or electrode 140, the rotatable contacting member 134, and the electrical circuit 146 to the low voltage power source 138. The other electric counter 145 is inactive during this phase due to the open circuit between the stationary contactor plate or electrode 141 and the rotatable contacting member 134. When the vertical shaft 116 rotates 180° or one-half revolution it also rotates the control shaft 130 which carries with it the contact member 134 so that it is positioned, as shown by the dotted outline, in contact with the stationary contactor plate 141 to activate the other counter 145 and signal ligh 156. The first counter 144 is inactive at this time and is read by the operator and recorded on a suitable tabular form after which it is reset to zero.

As the shaft 116 rotates 180° between the building of successive layers the selector switch contact member 134 makes momentary contact with the small contactor plates or electrodes 142 and 143 and a pulse passes through the corresponding closed switch 158 or 159, to activate the solenoid 42 to effect marking of the roving strand, using the same marking means 30 as in the above preferred embodiment.

To visibly indicate this action to the operator, who may be some distance away, a signal light 160 is connected in the solenoid circuit and flashes momentarily.

After a layer has been completed, the vertical shaft 116 and control shaft 130 again rotate 180° during which the contact member 134 passes over the other contactor plate 143, which in turn causes a pulse of electric current to flow through the closed switch 159 to operate the solenoid 42 and mark the strand and energize the signal light 160. During the processing of each full bobbin or package of roving the manual switches 158 and 159 may be opened or closed to control operation of the marking means 30 between successive layers, between each pair of layers, or to give no mark on the roving when such a condition is desired, as when it is desired to measure the start and completion of a package without recording the length of the intermediate layers.

The measuring of the length of the layers marked by the above alternate embodiment is accomplished with the unwinding means 34 of the first described preferred embodiment with the stretch determinations corresponding substantially to the stretch occurring in actual layers of the completed package.

The present invention has been described above for purposes of illustration only, and is not intended to be limited by this description or otherwise except as defined in the appended claims.

I claim:

1. A method of measuring stretch occurring in a strand of roving, yarn or the like during a winding operation wherein the strand is advanced to said winding operation continuously from a pair of rollers, said method comprising intermittently marking said continuously advancing strand as it leaves said rollers and advances to said winding operation, counting the number of revolutions of one of said rollers between markings to determine the length of strand between markings, unwinding said strand without placing any longitudinal tension thereon following the winding operation, measuring the distance between markings on said unwound strand, and comparing the measurements of the unwound strand with the length between markings prior to winding.

2. The method of measuring stretch occurring in a strand of roving, yarn or the like during a winding operation according to claim 1 and characterized further in that the strand is marked at a selected number of revolutions of said one of said rollers.

3. A method of measuring stretch occurring in a strand of roving, yarn or the like during a winding operation that includes a builder motion and wherein the strand is advanced to said winding operation continuously from a pair of rollers, said method comprising marking said strand as it leaves said rollers at intervals corresponding to the interval between builder motion cycles, counting the number of revolutions of one of said rollers between builder motion cycles to determine the length of strand between markings prior to winding, unwinding said strand without placing any longitudinal tension thereon following the winding operation, measuring the distance between markings on said unwound strand, and comparing the measurements of the unwound strand with the length between markings prior to winding.

4. Means for measuring stretch occurring in a strand of roving, yarn or the like during processing wherein the strand is supplied continuously to said processing from a pair of rollers, said means comprising means for marking said strand at determinable intervals as it passes from said rollers to said processing, means for counting the number of revolutions of one of said rollers during the intervals between markings thereby to determine the lengths of the increments of said strand between markings prior to processing, electrical means for actuating said marking means, said electrical means being connected to said counting means so as to sense the number of revolutions between markings, means for measuring the length of said increments in the absence of any longitudinal tension after the strand leaves the processing and before it is subjected to further processing, the difference between the lengths of said increments before and after processing being equivalent to the stretch imparted during processing.

5. Means for measuring stretch occurring in a strand of roving, yarn or the like during processing wherein the strand is supplied continuously to said processing from a pair of rollers, said means comprising means for marking said strand including a marking element and a movable element engageable with said strand to move said strand from a normal path spaced from said marking element into marking contact with said marking element, means for counting the number of revolutions of one of said rollers, electrical means for actuating said marking means, said electrical means including a solenoid operably connected to said movable element, said electrical means having a switch that is normally open to render the solenoid inoperative, means for closing said switch to actuate the electrical means and thereby operate the solenoid to mark the strand, said electrical means being connected to said counting means so as to sense the number of revolutions between markings and thereby indicate the length of strand in the marked increments, means for measuring the length of said increments in the absence of any longitudinal tension after the strand leaves the processing and before it is subjected to further processing, the difference between the lengths of said increments before and after processing being equivalent to the stretch imparted during processing.

6. Means for measuring stretch occurring in a strand of roving, yarn or the like during processing wherein the strand is supplied continuously to said processing from a pair of rollers, said means comprising means sensing a predetermined number of revolutions of one of said rollers, means for marking said strand as it leaves said roller, means for actuating said marking means, said actuating means being controlled by said sensing means to actuate said marking means at said predetermined number of roller revolutions and thereby mark increments of determined length on said strand prior to processing, means for measuring the length of said marked increments in the absence of any longitudinal tension after the strand leaves the processing and before it is subjected to further processing, the difference between the lengths of said increments before and after processing being equivalent to the stretch imparted during processing.

7. Means for measuring the stretch occurring in a strand of roving, yarn or the like during processing wherein the strand is supplied continuously to said processing from a pair of rollers, said means comprising means for marking said strand, a drive gear connected to one of said rollers and rotated thereby, a driven gear connected to said drive gear and driven thereby, said gears having different number of teeth thereon and each having a hunting element, said hunting elements being engageable when aligned, the alignment of said hunting elements occurring at a number of revolutions that is determined by the number of teeth in the gears, means sensitive to alignment of said hunting elements and operably connected to said marking means to mark increments prior to processing of determined length on said strand when the hunting elements are aligned, the length being determined by roller revolutions between alignments of the hunting elements, means for measuring the length of said marked increments after the strand leaves the processing and before it is subjected to further processing, the difference between the lengths of said increments before and after processing being equivalent to the stretch imparted during processing.

8. Means for measuring the stretch occurring in a strand of roving, yarn or the like during processing wherein the strand is supplied continuously to said processing from a pair of rollers, said means comprising means for marking said strand, a drive gear connected to one of said rollers and rotated thereby, a driven gear connected to said drive gear and driven thereby, said driven gear being shiftable with respect to said drive gear, said gears having different number of teeth thereon and each having a hunting element, said hunting elements being engageable when aligned to shift said driven gear away from said drive gear, the alignment of said hunting elements occurring at a number of revolutions that is determined by the number of teeth in the gears, means for actuating said marking means and controlled by shifting of said driven gear so as to actuate the marking means when the driven gear shifts and thereby mark increments of determined length on said strand prior to processing, means for measuring the length of said marked increments after the strand leaves the processing and before it is subjected to further processing, the difference between the lengths of said increments before and after processing being equivalent to the stretch imparted during processing.

9. Means for measuring stretch occurring in a strand of roving, yarn or the like during processing wherein the strand is supplied continuously to said processing from a pair of rollers, said means comprising means for marking said strand including a marking element and a movable element engageable with said strand to move said strand from a normal path spaced from said marking element into marking contact with said marking element, a drive gear connected to one of said rollers and rotated thereby, a driven gear connected to said drive gear and driven thereby, said driven gear being shiftable with respect to said drive gear, said gears having different number of teeth thereon and each having a hunting element, said hunting elements being engageable when aligned to shift said driven gear away from said drive gear, the alignment of said hunting elements occurring at a number of revolutions that is determined by the number of teeth in the gears, an electrical circuit having a normally open switch and including a solenoid connected to said movable element, a switch closing member responsive to movement of said driven gear away from said drive gear to close said switch and thereby activate said solenoid to move the movable element and force the strand into marking contact with the marking element to indicate increments on said strand prior to said processing, the length of said increments being proportional to the roller revolutions between engagement of hunting elements, means for measuring the length of said increments after the strand leaves the processing and before it is subjected to further processing, the difference between the lengths of said increments before and after processing being equivalent to the stretch imparted during processing.

10. Means for measuring stretch occurring in a strand of roving, yarn or the like as said strand is drawn from a pair of rollers and is wound on a bobbin or the like in layers with a builder motion assembly that reverses the axial feed of the strand with respect to the bobbin at the completion of the winding of each layer, said means comprising means operable to mark said strand as it leaves said rollers, operating means connected to said marking means to operate said marking means and thereby mark said strand, said operating means being connected to said builder motion assembly and being actuated by cycles thereof to operate said marking means at intervals corresponding to layers of strands being wound on said bobbin, means for counting the number of revolutions of one of said rollers between operations of said marking means, said number of revolutions providing an indication of the lengths of the increments of said strand between markings before being wound on said bobbin, means for measuring the lengths of said increments after being wound on said bobbin in the absence of any longitudinal tension, the difference between lengths of said increments before and after winding being equivalent to the stretch imparted during winding.

11. Means for measuring stretch occurring in a strand of roving, yarn or the like as said strand is drawn from a pair of rollers and is wound on a bobbin or the like in layers with a builder motion assembly that reverses the axial feed of the strand with respect to the bobbin at the completion of the winding of each layer, said means comprising means operable to mark said strand as it leaves said rollers, operating means connected to said marking means to operate said marking means and thereby mark said strand, said operating means being connected to said builder motion assembly and being actuated by cycles thereof to operate said marking means at intervals corresponding to layers of strands being wound on said bobbin, a pair of counting members for counting the revolutions of one of said rollers, means operated by said builder motion assembly for alternately connecting said counting members to said one roller in response to cycles of the builder motion to count roller revolutions between markings and thereby indicate the lengths of the increments of said strand between markings before being wound on said bobbin, means for measuring the lengths of said increments after being wound on said bobbin, the difference between lengths of said increments before and after winding being equivalent to the stretch imparted during winding.

12. Means for measuring stretch occurring in a strand of roving, yarn or the like as said strand is drawn from a pair of rollers and is wound on a bobbin or the like in layers with a builder motion assembly that reverses the axial feed of the strand with respect to the bobbin at the completion of the winding of each layer, said means comprising means operable to mark said strand as it leaves said rollers, operating means connected to said marking means to operate said marking means and thereby mark said strand, said operating means being connected to said builder motion assembly and being actuated by cycles thereof to operate said marking means at intervals corresponding to layers of strands being wound on said bobbin, a rotating electrical contact member connected to and rotatably driven by one of said rollers, a stationary electrical contact member over which said rotating member passes in contact, an electrical circuit including a power supply and said contact members, a pair of electrical counters connected in said circuit to said rotating contact member, a switch connected between said counters and operable to connect said counters alternately in said circuit, said counters when connected in the circuit being energized each time said rotating contact member contacts said stationary contact member, said switch being connected to said builder motion assembly and being operated upon reversals of said builder motion to connect alternate counters during the building of alternate layers of said strand on said bobbin, said counters thereby counting the number of revolutions of said roller during the building of each layer, which indicates the lengths of the increments of said strand between markings before being wound on said bobbin, means for measuring the lengths of said increments after being wound on said bobbin, the difference between lengths of said increments before and after winding being equivalent to the stretch imparted during winding.

13. Means for measuring stretch occurring in a strand of roving, yarn or the like as said strand is drawn from a pair of rollers and is wound on a bobbin or the like in layers with a builder motion assembly that reverses the axial feed of the strand with respect to the bobbin at the completion of the winding of each layer, said means comprising means operable to mark said strand as it leaves said rollers, an electrically actuated operating means connected to said marking means to operate said marking means, a rotating electrical contact member connected to and rotatably driven by one of said rollers, a stationary electrical contact member over which said rotating member passes in contact, an electrical circuit including a power supply and said electrically actuated operating means and said contact members, a pair of electrical counters connected in said circuit to said rotary contact member, a four position pivotal switch in said circuit connected to said builder motion assembly for pivotal movement in response to the cycles of said builder motion in forming layers of strand on said bobbin, said pivotal switch dwelling alternately in opposed dwell positions during building of alternate layers and pivoting through opposed intermediate positions when moving from one dwell position to the other, in the dwell positions said pivotal switch connecting said counters alternatley into the circuit, in the intermediate positions said pivotal switch connecting said operating means into said circuit to operate said marking means and mark said strand, said counters when connected by said pivotal switch indexing each time said rotating contact member contacts said stationary contact member thereby counting the number of revolutions of said roller during the building of each layer, which indicates the lengths of the increments of said strand between markings before being wound on said bobbin, means for measuring the lengths of said increments after being wound on said bobbin, the difference between lengths of said increments before and after winding being equivalent to the stretch imparted during winding.

14. Means for measuring stretch occurring in a strand of roving or the like during a winding process wherein the strand is wound on a bobbin or the like, said means comprising means for marking said strand at determinable intervals as it is supplied to said winding process, means for measuring the lengths of said strand between markings before winding, means for supporting said bobbin for free rotation after the strand is wound thereon, an unwinding member having a surface in contact with the strand on the bobbin when the bobbin is in the supporting means, said surface being movable while in contact with said strand to cause the bobbin to rotate and the strand to unwind without tension so that the lengths between markings can be measured and compared with the lengths before winding to indicate the stretch occurring during winding.

15. Means for measuring stretch occurring in a strand of roving or the like during a winding process wherein the strand is wound on a bobbin or the like, said means comprising means for marking said strand at determinable intervals as it is supplied to said winding process, means for measuring the lengths of said strand between markings before winding, a rotatable, unwinding drum having a cylindrical surface, means for supporting the bobbin with the strand wound thereon for free rotation and in contact with the surface of said drum, rotation of the drum causing rotation of the bobbin and unwinding of the strand therefrom without tension so that the lengths between markings can be measured and compared with the lengths before winding to indicate the stretch occurring during winding.

References Cited in the file of this patent

UNITED STATES PATENTS

| | | |
|---|---|---|
| 84,290 | Luckett | Nov. 24, 1868 |
| 618,656 | Fowler | Jan. 31, 1899 |
| 1,829,318 | Walen | Oct. 27, 1931 |
| 1,887,851 | Hinsky | Nov. 15, 1932 |
| 2,047,814 | Aken | July 14, 1936 |
| 2,174,129 | Van Kempen | Sept. 26, 1939 |
| 2,332,573 | Hibschman et al. | Oct. 26, 1943 |
| 2,387,867 | Adams | Oct. 30, 1945 |
| 2,488,277 | Falk et al. | Nov. 15, 1949 |
| 2,563,814 | Brink | Aug. 14, 1951 |

FOREIGN PATENTS

| | | |
|---|---|---|
| 567,784 | Great Britain | Mar. 2, 1945 |
| 145,346 | Australia | Sept. 22, 1949 |